(12) United States Patent
Anthoine et al.

(10) Patent No.: US 7,220,199 B2
(45) Date of Patent: May 22, 2007

(54) INFINITELY VARIABLE POWER BRANCHING TRANSMISSION WITH TWO OPERATING MODES

(75) Inventors: Pierre Anthoine, Rueil Malmaison (FR); Magali Rouge, Rueil Malmaison (FR); Sebastien Chanson, Paris (FR); Ahmed Kefti-Cherif, Trappes (FR); Keyvan Kergar, Le Pecq (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 10/474,181

(22) PCT Filed: Apr. 5, 2002

(86) PCT No.: PCT/FR02/01197

§ 371 (c)(1),
(2), (4) Date: Mar. 3, 2004

(87) PCT Pub. No.: WO02/081246

PCT Pub. Date: Oct. 17, 2002

(65) Prior Publication Data

US 2004/0157693 A1    Aug. 12, 2004

(30) Foreign Application Priority Data

Apr. 6, 2001    (FR) .................................. 01 04690

(51) Int. Cl.
*F16H 3/72*    (2006.01)
*F16H 37/06*    (2006.01)
(52) U.S. Cl. .................. 475/5; 180/65.2; 180/65.3
(58) Field of Classification Search .................... 475/5; 477/3, 5; 180/65.2, 65.3; 701/22
See application file for complete search history.

(56) References Cited

U.S. PATENT DOCUMENTS

| 4,588,040 | A | | 5/1986 | Rollins et al. | |
|---|---|---|---|---|---|
| 5,558,589 | A | | 9/1996 | Schmidt | |
| 5,571,058 | A | | 11/1996 | Schmidt | |
| 5,935,035 | A | | 8/1999 | Schmidt | |
| 6,090,005 | A | * | 7/2000 | Schmidt et al. | 475/5 |
| 6,234,930 | B1 | * | 5/2001 | Kaneko et al. | 475/5 |
| 6,358,173 | B1 | * | 3/2002 | Klemen et al. | 475/5 |
| 6,371,882 | B1 | * | 4/2002 | Casey et al. | 477/5 |
| 6,491,599 | B1 | * | 12/2002 | Schmidt | 475/5 |
| 6,551,208 | B1 | * | 4/2003 | Holmes et al. | 475/5 |
| 6,558,283 | B1 | * | 5/2003 | Schnelle | 475/5 |
| 6,566,826 | B2 | * | 5/2003 | Imai et al. | 318/11 |
| 6,793,600 | B2 | * | 9/2004 | Hiraiwa | 475/5 |
| 6,878,092 | B1 | * | 4/2005 | Schustek et al. | 477/3 |
| 2002/0094898 | A1 | * | 7/2002 | Hata et al. | 475/5 |
| 2003/0013569 | A1 | * | 1/2003 | Doepke | 475/5 |

FOREIGN PATENT DOCUMENTS

| EP | 0 937 600 | | 8/1999 |
|---|---|---|---|
| FR | 2 739 330 | | 4/1997 |
| WO | WO 9955551 A1 | * | 11/1999 |
| WO | 00 06407 | | 2/2000 |
| WO | WO00/26053 | * | 5/2000 |

* cited by examiner

*Primary Examiner*—David D. Le
(74) *Attorney, Agent, or Firm*—Oblon, Spivak, McClelland, Maier & Neustadt, P.C.

(57) ABSTRACT

An infinitely variable power branching transmission with first and second operating modes, whereof the components are distributed between two power paths connecting in parallel an engine to vehicle wheels. At least two planetary trains, two electrical machines, a reduction stage, and a control orient differently the power between the transmission input and output based on the operating mode thereof. Two reduction stages are arranged in parallel between the two planetary trains on the same power path, the two reduction stages being respectively urged in the first and in the second operating transmission mode.

20 Claims, 6 Drawing Sheets

INFINITELY VARIABLE POWER BRANCHING TRANSMISSION WITH TWO OPERATING MODES

BACKGROUND OF THE INVENTION

1. Technical Field

The present invention relates to a power-splitting transmission wherein, regardless of how fast the internal combustion engine is spinning, a continuous variation from reverse gear to forward gear can be achieved by passing through a special position known as "engaged neutral", in which the speed of movement of the vehicle is zero.

More precisely, its object is a power-splitting infinitely variable transmission having two modes of operation, wherein the constituent elements are distributed between two power trains that provide parallel connections between the internal combustion engine and the wheels of the vehicle, these means including at least two epicyclic gear sets, two electrical machines, one reducing gear stage and control means that guide the power between the input and output of the transmission differently depending on the mode of operation thereof.

2. Background Art

Power-splitting transmissions may be based on three known principles or modes of power splitting. According to the first mode, known as "coupled input", the transmission is provided with a pair of power-splitting pinions that splits the power at the input of the mechanism and with an epicyclic "assembler" gear set that recombines the powers at the output of the mechanism. The control element is a variator.

In transmissions with power splitting of the "coupled output" type, there is provided, for example, a power-dividing planetary gear set at the input of the mechanism and a power-reassembling pair of pinions at the output of the mechanism, the control element again being a variator.

Finally, in transmissions with power splitting of the "two matching points" type, a first power-dividing epicyclic gear set can be positioned at the gearbox input, while a second power-reassembling epicyclic gear set is disposed at the gearbox output, the control element again being a variator.

The traditional infinitely variable transmissions (IVT) use only one or two of these three operating principles.

From U.S. Pat. Nos. 5,558,589 and 5,935,035 there are known infinitely variable transmissions with two modes of operation combining at least two planetary gear sets, two mode-changing clutches and one electrical variator, and using as the first mode of operation the principle of power splitting with coupled output.

According to these publications, the mode-changing means are positioned outside the epicyclic gear sets.

The significance in having two modes of operation available lies in the increase of the range of transmission ratios and in the possibility of reducing the size of the electrical machines.

Nevertheless, in these known two-mode architectures, the mode changes are achieved by multiple-disk clutches disposed on the transmission output, and for this reason are accompanied by torque jolts that are sensed as unpleasant by the users.

Another disadvantage of the architectures described in these publications lies in their complexity, which is related in particular to the presence of at least two clutches and one brake.

DISCLOSURE OF THE INVENTION

The object of the present invention is to provide a power-splitting infinitely variable transmission with two modes of operation, wherein the architecture is simpler than that of the usual transmissions of the same type, electrical machines of small dimensions are used, and the changes of mode are not accompanied by any torque jolt.

To achieve this object, it is proposed that the mode changes be accomplished by acting on the internal mechanical linkages of the transmission situated between the two gear sets.

According to the invention, at least two reducing gear stages are disposed between the two epicyclic gear sets for this purpose, these stages being engaged in the first and second modes of operation respectively. These two reducing gear stages are disposed in parallel between the two gear sets on the same power train.

According to other characteristics of the invention, the two electrical machines are mounted in series on the same power train, and the two reducing gear stages are mounted in parallel between the two electrical machines.

Without departing from the scope of the invention, the electrical machines may also be connected to an energy-storage unit or to a generator.

According to the preferred embodiments of the invention, the proposed transmission may contain seven, six or five reducing gear stages, of which two are disposed outside the epicyclic gear sets.

BRIEF DESCRIPTION OF DRAWINGS

Other characteristics and advantages of the present invention will become clearly evident upon reading the description hereinafter with reference to the attached drawings, in which

FIG. 1 depicts a transmission according to a first embodiment of the present invention;

FIG. 2 depicts a transmission according to a second embodiment of the present invention;

FIG. 3 depicts a transmission according to a third embodiment of the present invention;

FIG. 4 depicts a transmission according to a fourth embodiment of the present invention;

FIG. 5 depicts a transmission according to a fifth embodiment of the present invention;

FIG. 6 depicts a transmission according to a sixth embodiment of the present invention;

FIG. 7 depicts a transmission according to a seventh embodiment of the present invention;

FIG. 8 depicts a transmission according to an eighth embodiment of the present invention;

FIG. 9 depicts a transmission according to a ninth embodiment of the present invention;

FIG. 10 depicts a transmission according to a tenth embodiment of the present invention; and FIG. 11 depicts the embodiment of FIG. 1 in which the two electrical machines are connected to a generator or energy-storage unit.

BEST MODE FOR CARRYING OUT THE INVENTION

Figure 1:
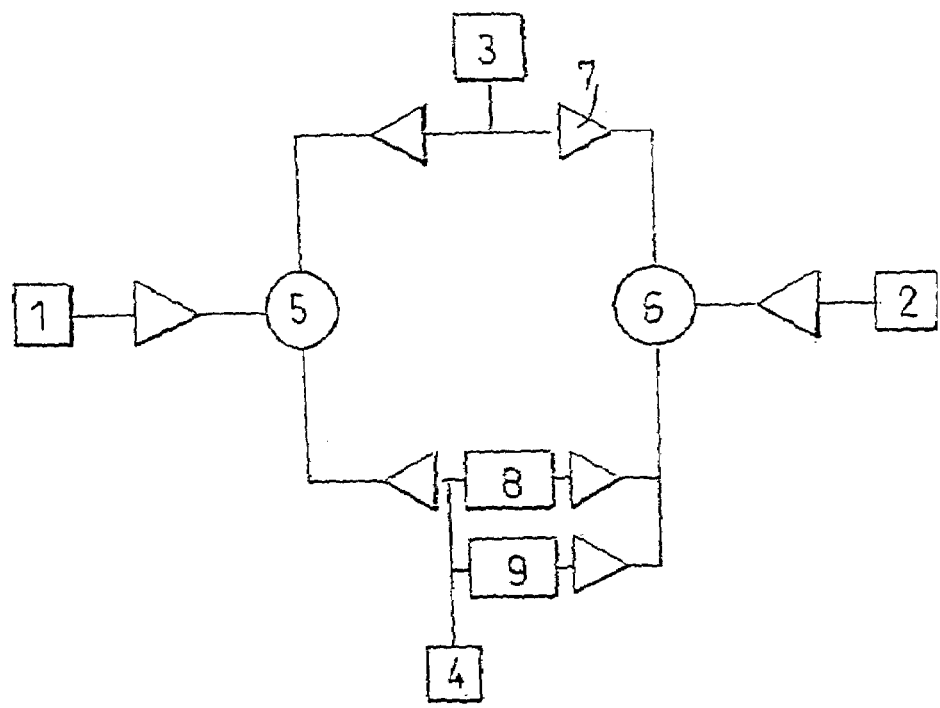
FIGS. 1 to 11 illustrate eleven special embodiments thereof.

The transmission of FIG. 1 is composed of two epicyclic gear sets 5, 6, seven reducing gear stages 7, two mode-changing systems 8 and 9, which may be either claw couplings or multiple-disk clutches, and two electrical machines 2, 4, which together constitute a variator.

This transmission has four input and output connections, which can be connected respectively to internal combustion engine 1, to wheels 3 and to two electrical machines 2 and 4.

Internal combustion engine 1 is connected to one reducing gear stage 7. Wheels 3 are connected to two reducing gear stages 7. A first electrical machine 2 of the variator is connected to one reducing gear stage 7, and a second electrical machine 4 is connected to one reducing gear stage 7 and to two mode-changing systems 8 and 9.

Three reducing gear stages are connected to the first epicyclic gear set 5. Four reducing gear stages are connected to the second epicyclic gear set 6. One reducing gear stage is connected to each mode-changing system 8 and 9.

The transmission illustrated by FIG. 1 therefore contains seven reducing gear stages, of which five are disposed between and two are disposed outside the two epicyclic gear sets.

Internal combustion engine 1 is connected to epicyclic gear set 5 via one reducing gear stage, and wheels 3 are connected to each epicyclic gear set 5, 6 via one reducing gear stage.

This transmission has two modes of operation with two matching points. In the first mode, first mode-changing system 8, connected to two reducing gear stages on the one hand and to one electrical machine 4 on the other hand, is open. This first branch is therefore disengaged, while the second branch, which contains second mode-changing system 9 and, just as the first branch, is connected to two reducing gear stages and to electrical machine 4, is closed.

Conversely, in the second mode of operation, the first branch is closed and the second branch is open.

Figure 2:
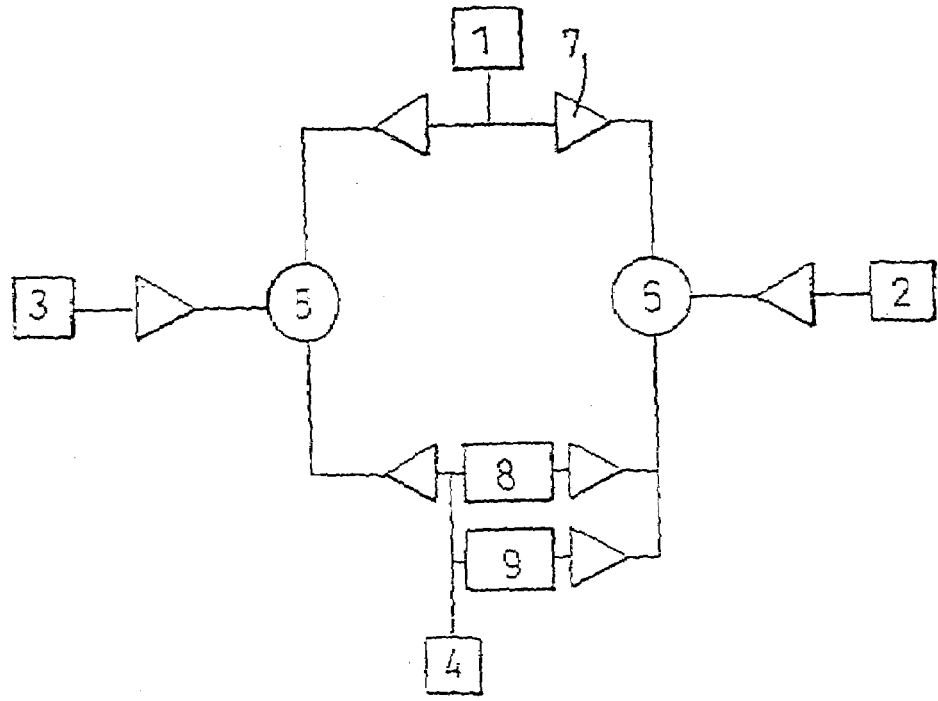

FIG. 2 shows the same elements as on FIG. 1. Just as the foregoing, this transmission has four input and output connections, which can be connected respectively to internal combustion engine 1, to wheels 3, to first electrical machine 2 and to second electrical machine 4. In this case the internal combustion engine is connected to each epicyclic gear set 5, 6 by one reducing gear stage 7, and wheels 3 are connected to a single epicyclic gear set 5 by one reducing gear stage.

Just as that in FIG. 1, the transmission of FIG. 2 is provided with two modes of operation having two matching points, depending on whether first and second mode-changing systems 8, 9, which are disposed in analogous manner, are open or closed.

The transmissions illustrated by FIGS. 3 to 6 contain six reducing gear stages, of which four are disposed between and two are disposed outside the two epicyclic gear sets.

Figure 3:
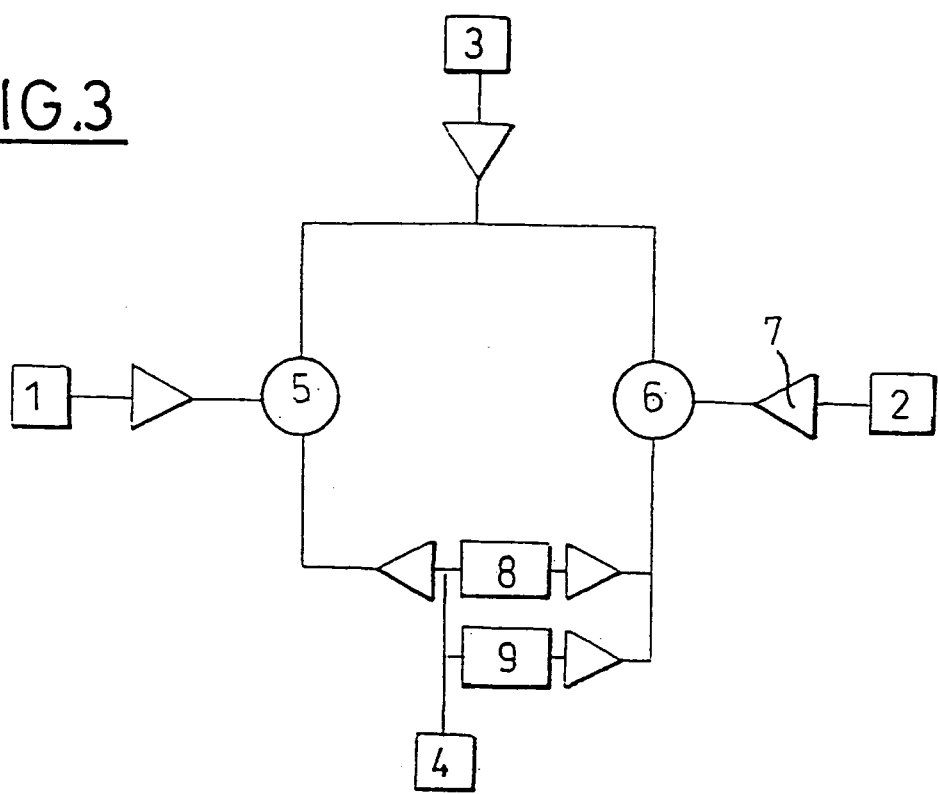

In FIG. 3, internal combustion engine 1 is connected via one reducing gear stage 7 to an epicyclic gear set 5.

Figure 4:
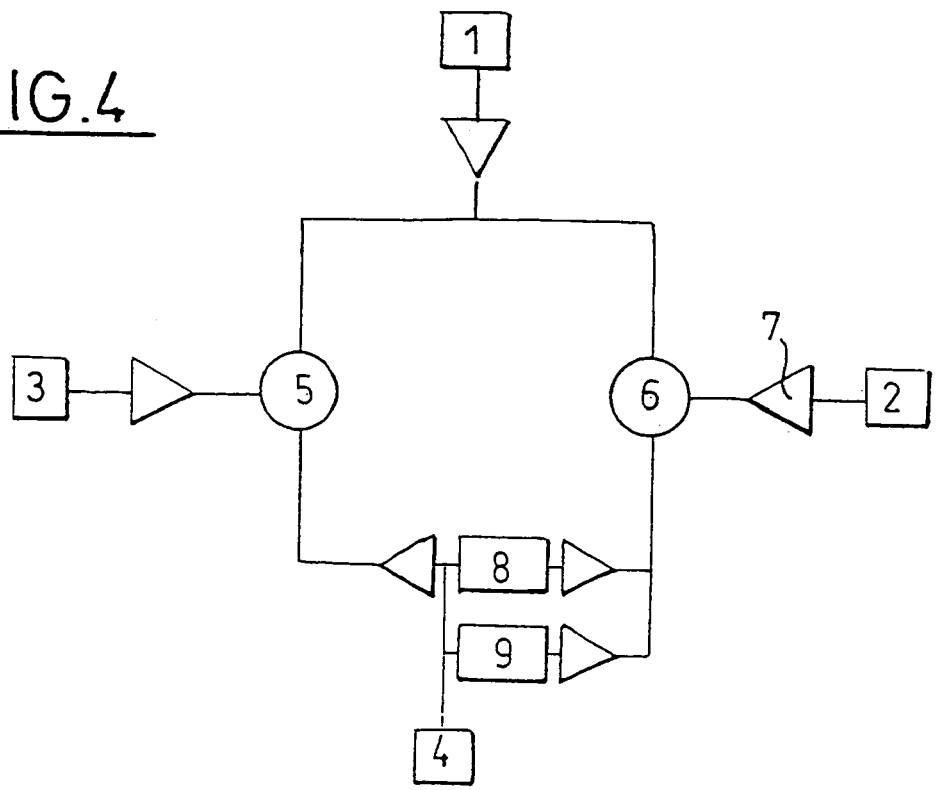

In FIG. 4, internal combustion engine 1 is connected via a single reducing gear stage 7 to two epicyclic gear sets 5, 6.

Figure 5:
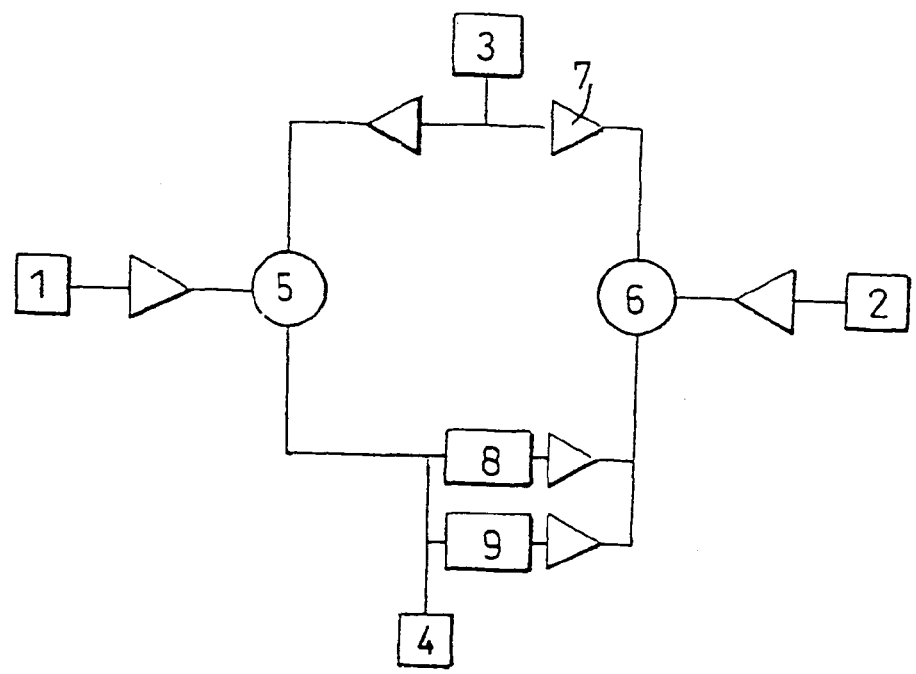

In FIG. 5, wheels 3 are connected to each epicyclic gear set. 5, 6 via one reducing gear stage 7.

Figure 6:
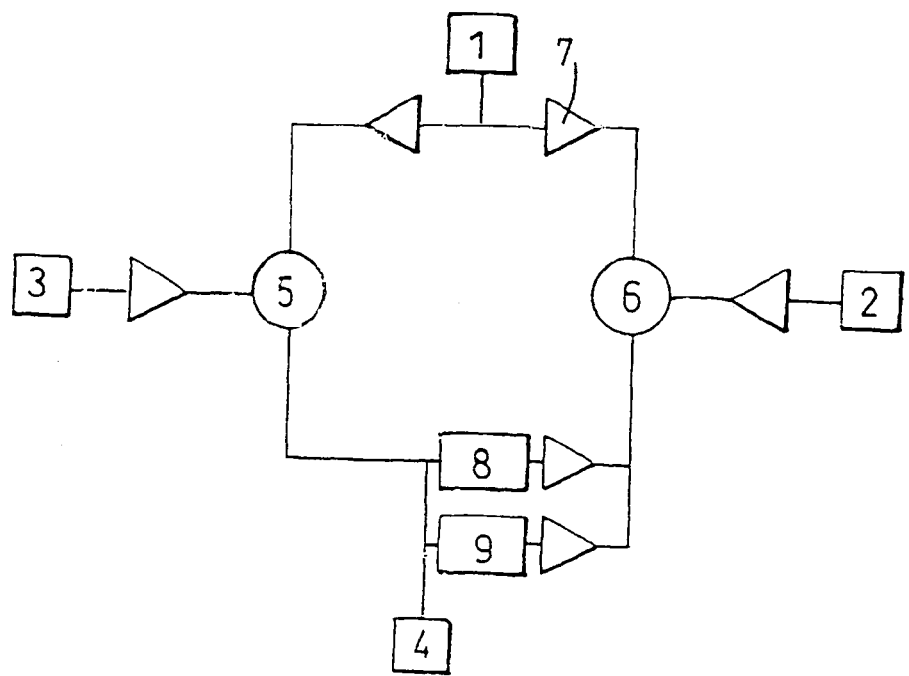

In FIG. 6, internal combustion engine 1 is connected to each epicyclic gear set 5, 6 by one reducing gear stage 7.

Figure 7:
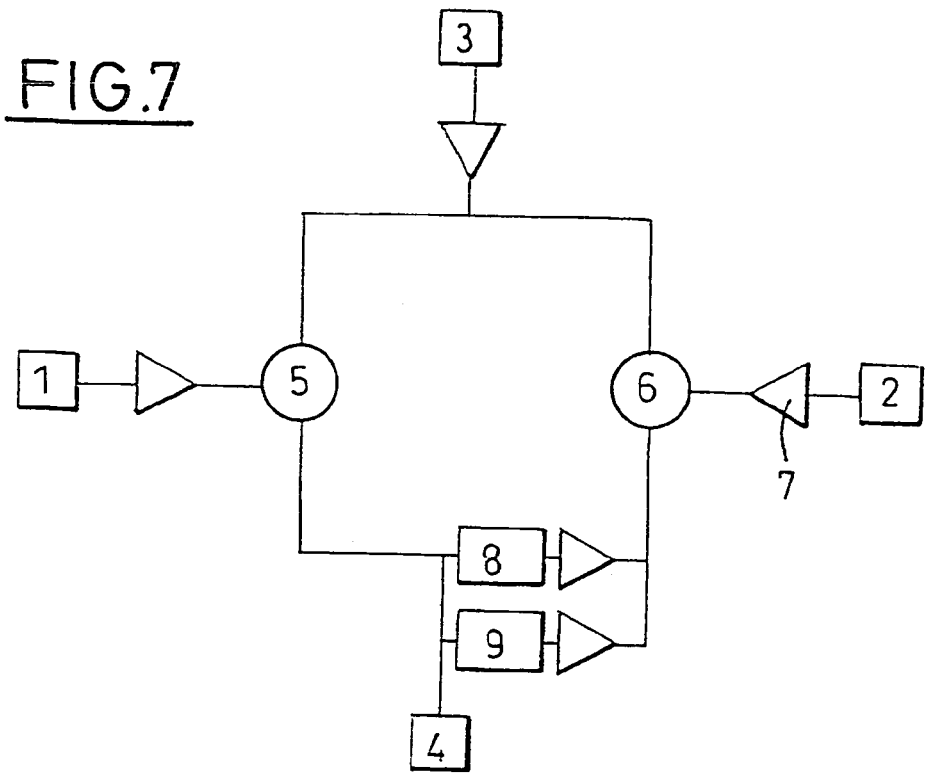
Figure 8:
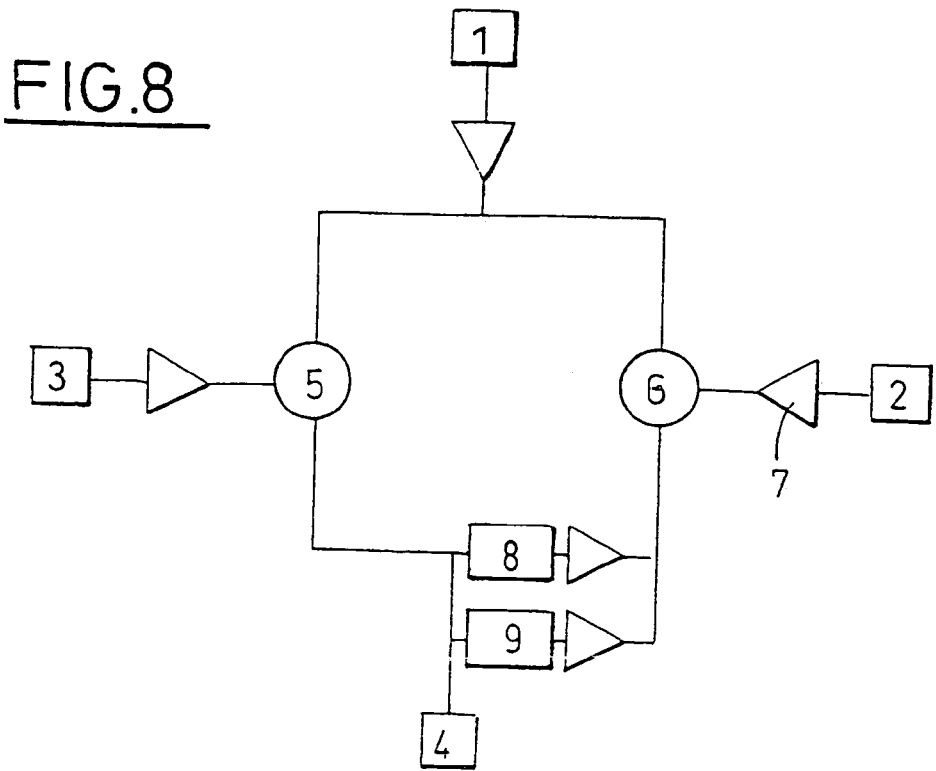

The transmissions according to the invention and illustrated by FIGS. 7 and 8 contain five reducing gear stages, of which three are disposed between and two are disposed outside the two epicyclic gear sets 5, 6.

In FIG. 7, internal combustion engine 1 is connected to one epicyclic gear set 5 via one reducing gear stage 7.

In FIG. 8, internal combustion engine 1 is connected to two epicyclic gear sets 5, 6 by a single reducing gear stage 7.

Figure 9:
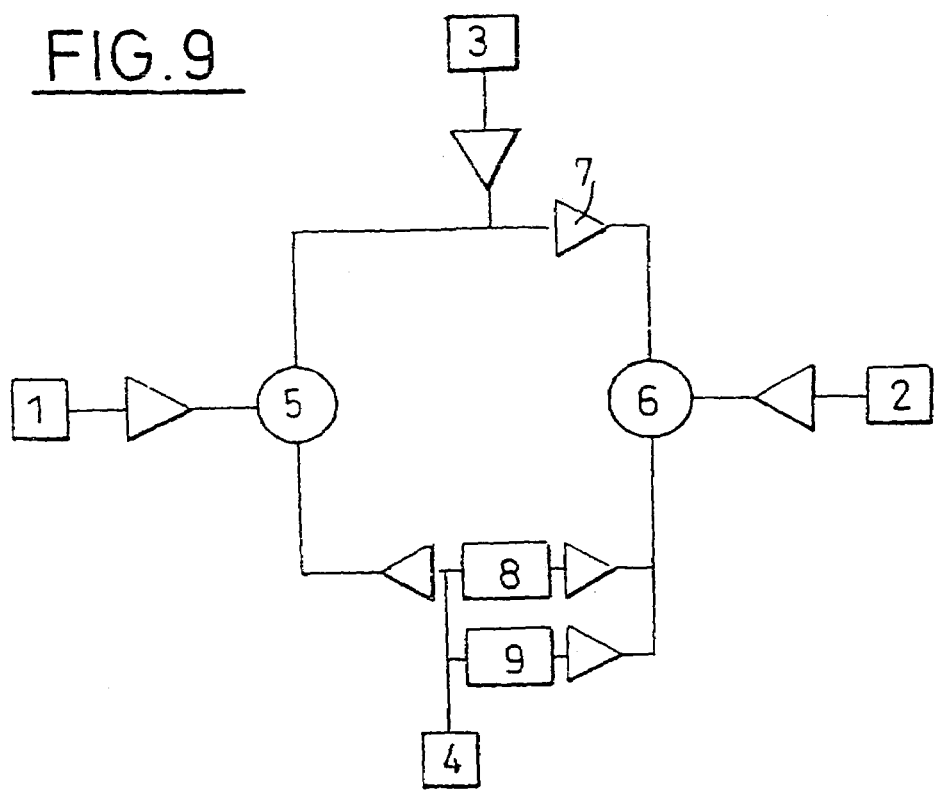
Figure 10:
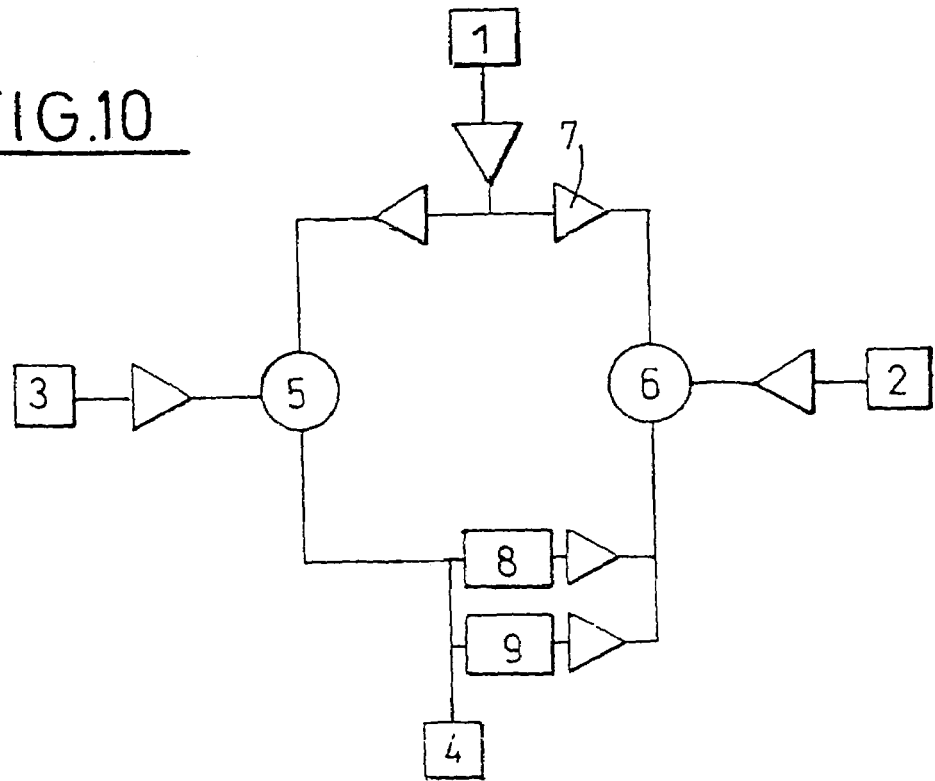

Finally, the transmissions of FIGS. 9 and 10, in common with those of FIGS. 1 and 2, contain seven reducing gear stages 7, of which five are disposed between and two are disposed outside the two epicyclic gear sets 5, 6.

In FIG. 9, wheels 3 are connected to epicyclic gear set 6 by two reducing gear stages 7 in series, while in FIG. 10 it is engine 1 that is connected to gear set 6 by two reducing gear stages 7 in series.

Figure 11:
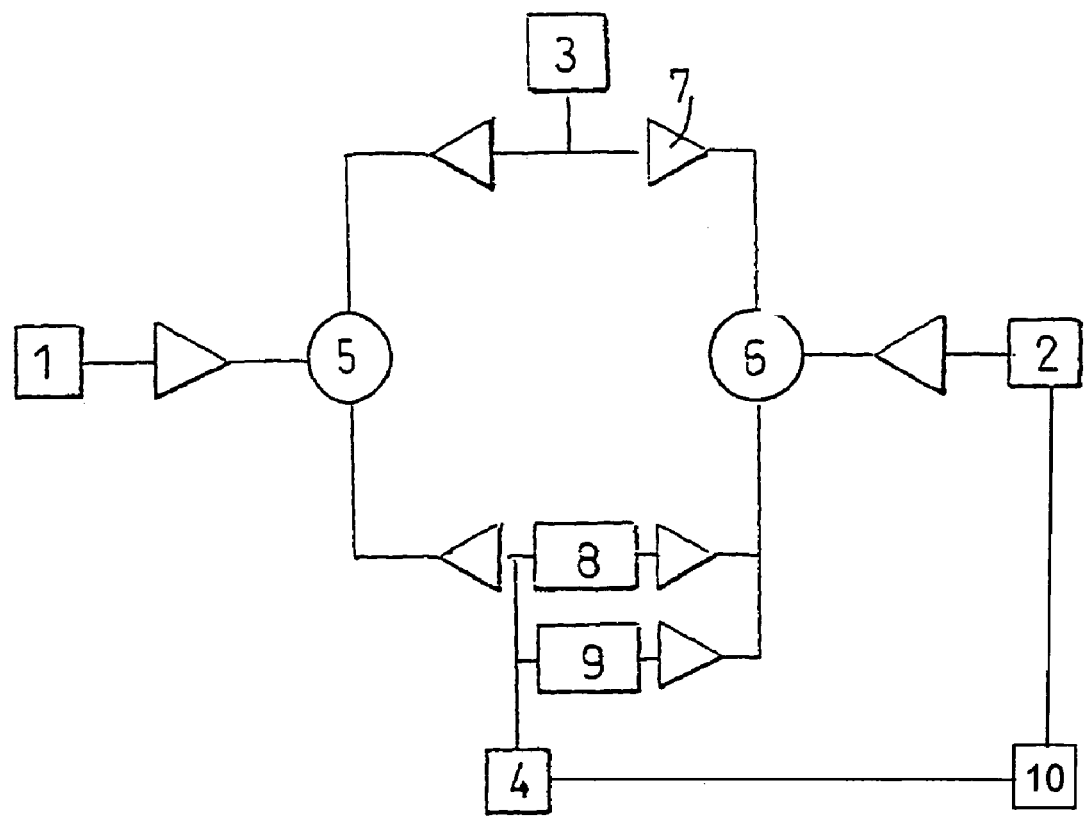

In conclusion, each of the non-limitative embodiments of the invention described hereinabove contains the two epicyclic gear sets, the two electrical machines and a certain number of reducing gear stages. The corresponding transmissions also contain control means (not illustrated), which guide the power between the input and the output of the transmission differently depending on the mode of operation thereof. The two electrical machines are mounted in series on the same power train, and can be connected to a generator or an energy-storage unit 10 as illustrated in FIG. 11, which depicts the embodiment of FIG. 1 including such a generator or energy-storage unit.

In all cases, the arrangement of two parallel branches between the two electrical machines, each containing one reducing gear stage and a mode-changing system, ensures that two modes of operation are available at two operating points, depending on the branch being used.

The invention claimed is:

1. A power-splitting infinitely variable transmission comprising:
    a first power train that provides a first torque transmitting connection for connecting an internal combustion engine to wheels of a vehicle;
    a second power train that provides a second torque transmitting connection for connecting the internal combustion engine to the wheels, said second torque transmitting connection being parallel to said first torque transmitting connection;
    two electrical machines provided along said second power train;
    a first epicyclic gear set provided along said second torque transmitting connection; and
    a second epicyclic gear set provided along said second torque transmitting connection,
    wherein said second power train includes first and second reducing gear stages providing parallel torque transmitting connections connecting said first epicyclic gear set to said second epicyclic gear set along only said second torque transmitting connection, and
    wherein said first reducing gear stage transmits torque from said first epicyclic gear set to said second epicyclic gear set in a first mode of operation and said second reducing gear stage transmits torque from said first epicyclic gear set to said second epicyclic gear set in a second mode of operation.

2. The transmission according to claim 1, wherein said first and second reducing gear stages are provided in parallel torque transmitting connections connecting said two electrical machines.

3. The transmission according to claim 1, wherein said two electrical machines are provided in series along said second torque transmitting connection.

4. The transmission according to claim 1, wherein said two electrical machines are connected to an energy-storage unit or an electrical energy generator.

5. The transmission according to claim 1, wherein said first epicyclic gear set is also provided along said first torque transmitting connection.

6. The transmission according to claim 5, further comprising:
- a third reducing gear stage provided along a torque transmitting connection for connecting the internal combustion engine to said first epicyclic gear set; and
- a fourth reducing gear stage provided along a torque transmitting connection connecting one of said two electrical machines to said second epicyclic gear set.

7. The transmission according to claim 6, further comprising:
- a fifth reducing gear stage provided along a torque transmitting connection for connecting the wheels to both said first power train and said second power train.

8. The transmission according to claim 7, further comprising:
- a sixth reducing gear stage provided along a first portion of said second torque transmitting connection connecting said second epicyclic gear set to said first epicyclic gear set.

9. The transmission according to claim 8, further comprising:
- a seventh reducing gear stage provided along a second portion of said second torque transmitting connection for connecting the wheels to said second epicyclic gear set.

10. The transmission according to claim 9, wherein said fifth reducing gear stage and said seventh reducing gear stage are configured to transmit torque in series between the wheels and said second epicyclic gear set.

11. The transmission according to claim 6, further comprising:
- a fifth reducing gear stage provided along a torque transmitting connection for connecting the wheels to said first power train; and
- a sixth reducing gear stage provided along a torque transmitting connection for connecting the wheels to said second power train.

12. The transmission according to claim 11, further comprising:
- a seventh reducing gear stage provided along a portion of said second torque transmitting connection connecting said second epicyclic gear set to said first epicyclic gear set.

13. The transmission according to claim 5, further comprising:
- a third reducing gear stage provided along a torque transmitting connection for connecting the wheels to said first epicyclic gear set; and
- a fourth reducing gear stage provided along a torque transmitting connection connecting one of said two electrical machines to said second epicyclic gear set.

14. The transmission according to claim 13, further comprising:
- a fifth reducing gear stage provided along a torque transmitting connection for connecting the internal combustion engine to said first power train; and
- a sixth reducing gear stage provided along a torque transmitting connection for connecting the internal combustion engine to said second power train.

15. The transmission according to claim 14, further comprising:
- a seventh reducing gear stage provided along a portion of said second torque transmitting connection connecting said second epicyclic gear set to said first epicyclic gear set.

16. The transmission according to claim 13, further comprising:
- a fifth reducing gear stage provided along a torque transmitting connection for connecting the internal combustion engine to both said first power train and said second power train.

17. The transmission according to claim 16, further comprising:
- a sixth reducing gear stage provided along a first portion of said second torque transmitting connection connecting said second epicyclic gear set to said first epicyclic gear set.

18. The transmission according to claim 16, further comprising:
- a sixth reducing gear stage provided along a portion of said first torque transmitting connection for connecting the internal combustion engine to said first epicyclic gear set; and
- a seventh reducing gear stage provided along a portion of said second torque transmitting connection for connecting the internal combustion engine to said second epicyclic gear set.

19. The transmission according to claim 18, wherein said fifth reducing gear stage and said sixth reducing gear stage are configured to transmit torque in series between the internal combustion engine and said first epicyclic gear set.

20. The transmission according to claim 18, wherein said fifth reducing gear stage and said seventh reducing gear stage are configured to transmit torque in series between the internal combustion engine and said second epicyclic gear set.

* * * * *